United States Patent [19]

Pinegar

[11] Patent Number: 4,590,080

[45] Date of Patent: May 20, 1986

[54] PROCESS FOR PREPARING PARFRIED AND FROZEN POTATO PRODUCTS

[75] Inventor: Richard K. Pinegar, Caldwell, Id.

[73] Assignee: J. R. Simplot Company, Boise, Id.

[21] Appl. No.: 637,682

[22] Filed: Aug. 2, 1984

Related U.S. Application Data

[63] Continuation of Ser. No. 479,696, Mar. 28, 1983, abandoned.

[51] Int. Cl.$^4$ ............................................. A23L 1/217
[52] U.S. Cl. ...................................... 426/441; 426/637
[58] Field of Search .............. 426/637, 438, 441, 808, 426/233

[56] References Cited

U.S. PATENT DOCUMENTS

| | | |
|---|---|---|
| 3,355,299 | 11/1967 | McLaughlin et al. . |
| 3,649,305 | 3/1972 | Wilder .............................. 426/441 X |
| 3,881,028 | 4/1975 | Capossela, Jr. et al. . |
| 3,934,046 | 1/1976 | Weaver et al. . |
| 4,109,020 | 8/1978 | Gorfien et al. . |
| 4,219,575 | 8/1980 | Saunders et al. . |
| 4,256,777 | 3/1981 | Weaver et al. .................. 426/438 X |
| 4,317,842 | 3/1982 | El-Hag et al. ................... 426/438 X |

FOREIGN PATENT DOCUMENTS 2078081 1/1982 United Kingdom ................ 426/438

*Primary Examiner*—Arthur L. Corbin
*Attorney, Agent, or Firm*—Pastoriza, Kelly & Lowry

[57] ABSTRACT

A process is provided for producing parfried and frozen potato product strips including but not limited to French fries, wherein the potato strips are adapted for reconstitution, immediately prior to consumption, in a microwave oven, conventional oven, convection oven, or finish fryer with highly desirable taste, color, and textural characteristics. The process comprises parfrying the potato strips under controlled time and temperature conditions to include two parfrying steps with an intermediate cooling step wherein the strips preferably are frozen to reduce the moisture content of the strips in accordance with a predetermined relationship of strip size, strip surface area, and moisture loss during processing. Potato strips prepared in accordance with the invention have been found to reconstitute with substantially optimum taste, color, and textural characteristics irrespective of the method of reconstitution, which may include microwave oven heating, heating in a conventional oven, convection oven heating, and finish frying in hot oil.

33 Claims, No Drawings

PROCESS FOR PREPARING PARFRIED AND FROZEN POTATO PRODUCTS

This application is a continuation of application Ser. No.479,696, filed Mar. 28, 1983, now abandoned.

BACKGROUND OF THE INVENTION

This invention relates generally to processes for preparing parfried and frozen potato products for subsequent reconstitution prior to consumption. More particularly, this invention relates to an improved process for preparing generally strip-shaped potato products adapted for reconstitution by any one of a number of heating processes, including microwave oven heating, conventional oven, convection oven heating, and finish frying.

Parfried and frozen potato products are widely available in the foods industry in a variety of different cut sizes and shapes, many of which are generally striplike and are sometimes generically referred to as "French fries." These potato products are conventionally prepared by cutting whole potatoes into strips of a desired size and shape which are then blanched in water or steam followed by partial frying, or parfrying, in hot oil to produce partially cooked potato strips. These strips are then frozen for packaging, shipping, and/or storage. Prior to consumption, the parfried and frozen potato strips are reconstituted, for example, by finish frying in oil, to reheat and finish-cook the strips.

A major objective of potato processers is to provide parfried and frozen potato strips which can be reconstituted with a combination of taste, color, odor, and textural characteristics selected for optimum consumer palatability. For example, it is highly desirable to provide parfried and frozen potato strips which, after reconstitution, exhibit a light and tender but crispy exterior surface encasing a soft and mealy interior having a moistness level which is neither too dry nor too soggy. However, achieving these desired product characteristics generally has been possible only when the strips are reconstituted by finish frying in hot oil. Reconstitution of the potato strips by alternative means, such as microwave oven heating or heating in a conventional or convection oven, generally has resulted in potato strips which are either unpalatably limp and soggy or which are undesirably dry, leathery, and tough.

Various proposals have been made for modifying parfry processing conditions and/or shapes of parfried and frozen potato strips in an effort to improve taste and textural characteristics, particularly when the strips are reconstituted rapidly in a microwave oven. See, for example, U.S. Pat. No. 4,109,020 which discloses combined parfrying and drying steps to reduce strip moisture content and thereby reduce the tendency of microwave-reconstituted strips to be limp and soggy. See also U.S. Pat. No. 4,219,575 which discloses a complex sinusoidal strip surface configuration for a so-called crinkle cut product which is subjected to a prolonged parfrying step and thereby exhibits increased crispiness when reconstituted by microwave oven heating. These processes, however, to the extent they provide any improvements in product characteristics, are limited in utility to specific types, shapes, and/or sizes of potato strips and thus are inapplicable for general use with potato strips of variant sizes and shapes. Moreover, the aforesaid processes are limited to a particular reconstitution means, namely, a microwave oven, and thus they do not provide parfried frozen strips adapted for reconstitution in any one of several different ways at the option and convenience of kitchen personnel and/or in accordance with the availability of cooking equipment. Still further, while these processes perhaps provide limited improvements with respect to some product characteristics, they do not provide reconstituted strips of optimum quality. For example, while increased crispiness might be obtained with some strip sizes and shapes, such improvement is achieved in combination with undesired levels of dryness and/or product toughness.

There exists, therefore, a significant need for a process applicable for preparation of parfried and frozen potato strips of different sizes and shapes wherein the strips can be reconstituted quickly and easily by any one of several methods, including microwave oven heating, convection oven heating, and finish frying, to provide a highly palatable food for consumption having substantially optimized taste, color, and textural characteristics. The present invention fulfills this need and provides further related advantages.

SUMMARY OF THE INVENTION

In accordance with the invention, a process is provided for preparing parfried and frozen potato product strips, such as French fries and the like, wherein the strips are adapted for reconstitution by any one of several common heating techniques, at the option and convenience of kitchen personnel, including microwave oven heating, conventional oven heating, convection oven heating, or rapid finish frying. When reconstituted, irrespective of the method of reconstitution, the potato strips exhibit taste, color, odor, and textural characteristics for substantially optimized consumer palatability. More particularly, the reconstituted potato strips prepared in accordance with the present invention exhibit a light and tender but crispy exterior surface with a desired degree of crispiness encasing a soft and mealy interior having a highly desirable moisture content.

The process of the present invention resides in part in a recognition of the relationship between certain product physical characteristics before and after parfrying and freezing wherein this relationship can be used to predict and insure substantially optimized quality when the potato strips are subsequently reconstituted, regardless of the method of reconstitution. More particularly, the present invention recognizes that, for potato product strips of any given size, shape, and surface area configuration, a moisture content after parfrying and freezing, unique to those strips, is required for optimum physical characteristics and palatability upon reconstitution. In general, the desired moisture content for the potato strips after parfrying and freezing increases with the overall strip size and shape, whereby moisture loss during processing which occurs primarily during parfrying and at a rate functionally related to the total exposed cut strip surface area through which the moisture escapes, is controlled in accordance with the aforesaid relationship to obtain potato strips which will reconstitute with optimum quality characteristics.

More specifically, it has been discovered that the quality characteristics upon subsequent reconstitution of parfried and frozen potato product strips having a generally regular exterior surface can be accurately and consistently indicated by the mathematical product of strip surface area per unit length, moisture loss in weight percent during processing, and mass moisture loss during processing. For potato product strips having an irregular exterior surface, such as so-called crinkle cut strips or strips having portions covered by peel which has not been removed, the subproduct of moisture loss in weight percent and mass moisture loss is normalized by the relative increase and decrease in moisture loss rate anticipated for that product. In all cases, however, it has been discovered that quality characteristics upon reconstitution will be substantially optimized when this mathematical product generally equals an empirically determined constant value.

In accordance with the invention, the above-described mathematical product is obtained by measuring actual average surface area of each strip per inch length, and multiplying this number times the subproduct of moisture loss in percent weight and mass moisture loss in grams during parfrying. These moisture loss values are calculated from laboratory determinations of initial moisture content percent of the strips in a raw state and final moisture and fat content of the strips after parfrying. For product strips having a regular sided exterior surface shape defined by peeled flat or broadly arcuate surfaces, it has been found that substantially optimized product characteristics will be obtained upon reconstitution when the final product is in the range of 0.32–0.46 and preferably about 0.39.

For product strips having an irregular exterior surface shape, such as so-called crinkle cut strips, it has been found that the relative moisture loss rate through each increment of cut surface area is relatively decreased as a result of the relatively increased exposed strip surface area per unit weight. Accordingly, for such strips, the moisture loss subproduct is normalized by factoring one minus the percent surface area increase from a regular or flat-sided product of similar dimensions. Similarly, for product strips having a portion thereof covered by peel left intact, it has been discovered that the relative moisture loss rate through the peeled or exposed surface area portions is relatively increased per unit weight. Accordingly, for peel-on strips, the moisture loss subproduct is normalized by factoring one plus the percent surface area attributed to the peel.

Importantly, when the empirically determined constant value is obtained by appropriate alteration and adjustment of parfry parameters including oil temperature and parfry time, it has been discovered that the parfried and frozen potato strips can be reconstituted by any one of several heating techniques, such as microwave oven heating, conventional or convection oven heating, or finish frying in hot oil. Accordingly, the process of the present invention includes adjustment of the parfry parameters to obtain parfried and frozen strips which provide the calculated constant value for optimum reconstituted quality, whereupon the potato strips can be processed in production quantities with confidence that they will reconstitute with substantially optimum physical characteristics for maximum consumer acceptance.

The process of the present invention resides further in a particular double parfrying and freezing procedure which has been found to substantially enhance reconstituted potato strip quality and to permit substantially uniform reconstituted quality regardless of the specific method of reconstitution. This highly prefered procedure includes a first parfrying step in hot oil subsequent to blanching followed by a cooling step which preferably freezes the potato strips. This cooling step is in turn followed by a second parfrying step in hot oil wherein additional moisture is removed from the potato strips in accordance with the relationship described above, whereupon the twice-parfried strips are frozen and packaged for subsequent shipment and/or storage prior to reconstitution immediately in advance of consumption.

The process of the present invention is therefore particularly adaptable for use with parfried and frozen striplike potato products of a variety of sizes and shapes to insure reconstitution with substantially optimum quality having a light and crispy exterior in combination with a soft and desirably moist but mealy interior. The products processed in accordance with this invention advantageously can be reconstituted by any of a number of different reconstitution techniques.

DETAILED DESCRIPTION OF THE PREFERRED EMBODIMENT

The present invention relates to a process for preparing generally strip-shaped parfried and frozen potato products wherein the process is applicable to strips of different size and shape, for reconstitution, prior to consumption, by any one of a number of common reconstitution methods, including microwave oven heating, conventional oven heating, convection oven heating, and rapid finish frying. The preparation process of this invention recognizes and utilizes a predetermined relationship of strip size, overall exposed or cut strip surface area, and moisture loss during processing in combination with a preferred double parfry procedure to insure reconstitution with substantially optimum consumer palatability irrespective of the particular method of reconstitution.

More specifically, the preparation process of this invention resides in part in a recognition that parfried and frozen potato strips of different sizes and shapes desirably exhibit different relative moisture contents for optimum physical characteristics upon reconstitution. For example, relatively small potato strips having a small cross-sectional size of the type commonly referred to as "shoestrings" desirably have a relatively low moisture content in combination with a relatively high crispiness when reconstituted for optimum consumer palatability. Somewhat larger potato strips, such as conventional "French fries" having cross-sectional dimensions on the order of about one-half inch square, desirably have a comparatively higher moisture content when reconstituted, as compared with shoestring strips, to provide a soft and moist mealy interior with an outer surface which is light, tender, and relatively crisp. Still larger potato strips of the type sometimes referred to as "steak fries," which have a rectangular cross section defined by sides on the order of about one-half inch and seven-eighths inch, are considered by consumers to have optimum palatability when such products have a still larger moisture content in comparison with conventional French fries.

In the past, these and other potato strips generally have been parfried and frozen for subsequent reconstitution with substantially optimized physical characteristics by means of a single reconstitution method, specifically finish frying in hot oil. When reconstituted by other methods, however, the parfried potato strips have generally exhibited marginal or undesirable physical characteristics. For example, many consumers have desired and therefore attempted to reconstitute the potato strips by conventional or convection oven heating which has normally produced strips which were undesirably limp and soggy with little or no crispiness. Attempts to improve quality by longer heating times or higher heating temperatures have generally been unable to provide the desired balance of a soft and moist interior encased by a crisp tender exterior surface, but instead such attempts have resulted in strips which were generally leathery, dry, and tough. Similarly, many consumers have desired and thus attempted to reconstitute the potato strips by rapid heating in a microwave oven, but such attempts generally have produced products with the same undesirable physical characteristics as those produced by convection oven heating.

The process of the present invention provides a method for controlling moisture loss from potato strips in accordance with the particular size and shape. This moisture loss control has been found to provide parfried and frozen potato strips which can be reconstituted by any one of several methods, including microwave oven heating, conventional or convection oven heating, or finish frying. Accordingly, kitchen personnel can select the reconstitution method in accordance with convenience and availability of equipment. Moreover, when the potato strips are parfried and frozen for controlled moisture loss in accordance with the preferred double parfry arrangement as will be described, the potato strips have been discovered to reconstitute with substantially optimum quality characteristics generally irrespective of the reconstitution method chosen.

Potato strip moisture loss during parfrying is controlled in accordance with a mathematical correlation with strip size and exposed cut strip surface area. More particularly, it has been discovered that the mathematical product of strip surface area, in square inches per inch length, and moisture loss subproduct, determined by factoring moisture loss in weight percent and mass moisture loss in grams during processing, generally yields an empirically determined constant value when peeled potato strips of generally regular cut shape are parfried and frozen in a manner which will yield optimum quality characteristics when reconstituted, regardless of the specific method of reconstitution. For irregular-shaped product strips or those having a portion covered by peel, this mathematical product is normalized by anticipated relative increase or decrease in moisture loss rate to yield the same empirically determined constant value. This empirically determined constant value, referred to hereinafter for sake of convenience as "Surface Area Constant" or "SAC," provides an indication of the quality characteristics upon reconstitution of virtually any potato strip size and shape and therefore further indicates how the parfry processing parameters should be altered to insure optimized quality characteristics when reconstituted.

The present invention is particularly useful in commercial scale parfrying and freezing operations wherein potato strip samples are typically analyzed periodically for moisture loss and fat content for a variety of production monitoring purposes. These analyses are usable directly in determining the SAC value for the particular product strips being processed thereby to provide a direct indication as to how processing conditions should be altered, if at all, to insure optimum quality when reconstituted. Use of the determined SAC value to monitor and alter processing conditions conveniently avoids the need to reconstitute a large number of strip test samples to determine reconstituted quality, thereby facilitating process monitoring particularly when a production line is changed over from one strip size to another.

The Surface Area Constant, or SAC value, is obtained and represented mathematicaly as follows:

$$SAC = PSA \times PML \times GML$$

wherein:
PSA represents average exposed cut strip surface area in square inches per inch length;
PML represents average strip moisture loss in weight percent in accordance with the formula:

$$\frac{(\% \text{ moisture raw}) - (\% \text{ moisture parfried/frozen})}{(\% \text{ moisture raw})}$$

GML represents average grams moisture loss in accordance with the formula:

$$\frac{(\text{Grams moisture raw}) - (\text{Grams moisture parfried/frozen})}{(\text{Grams moisture raw})}$$

PSA is determined by measuring the actual average surface area in square inches of the potato strips to be processed and dividing this measured area by the average strip length. Typically, for many popular potato strip sizes and shapes, this average length is on the order of three inches.

PML and GML are determined by laboratory measurement of average potato strip moisture and solids content in a raw condition. In addition, moisture content and fat content subsequent to parfrying and freezing are determined. The methods of performing these determinations are well known to those skilled in the art and thus are not described in detail herein. However, these measurements are usable in determining percent moisture and grams moisture in a raw condition and subsequent to parfrying and freezing thereby permitting direct calculation of PML and GML.

It has been found that parfried and frozen potato strips having a regular-shaped exterior surface with peel entirely removed will reconstitute with substantially optimized physical characteristics when the SAC value is $0.39 \pm 0.07$. For irregular-shaped product strips, such as so-called crinkle cut strips, it has been found that the relative moisture loss rate per increment of surface area of the strips is decreased in comparison with regular cut shapes as a result of relatively increased strip surface area. For crinkle cuts, therefore, it is necessary to normalize the moisture loss subproduct of percent and grams moisture loss by a factor of one minus the percent increase in surface area from a regular cut, otherwise expressed as:

$$PML \times GML \times [1 - \% \text{ increase in surface area}]$$

For product strips having peel remaining on a portion of the exterior surface, it has been found that the peel substantially prevents moisture loss therethrough while permitting heat ingress, resulting in a substantially increased moisture loss rate per exposed or cut surface area increment during processing. For peel-on products, therefore, it is necessary to normalize the moisture loss subproduct by a factor of one plus the percent decrease in surface area covered by the peel, otherwise expressed as:

PML×GML×[1+% peel surface area]

The applicability of the preferred SAC value of 0.39±0.07 has been demonstrated by extensive test and evaluation of potato strips parfried in accordance with various parameters and subsequently reconstituted by different methods including microwave oven heating, convection oven heating, and finish frying. Such reconstituted strips were inspected and tested for taste, color, odor, and a variety of textural characteristics by an expert panel consisting of three to six food scientists trained in the evaluation of parfried and frozen potato products for maximum consumer acceptability. This expert panel graded the tested potato strips in accordance with the following quality scale rating based upon overall strip quality and perceived consumer acceptability and palatability, with the most predominant characteristics being limpness or sogginess as opposed to dryness or toughness. SAC values and ranges were correlated with the quality scale rating as indicated hereinbelow.

| Rating | Description | SAC Value |
| --- | --- | --- |
| 1. | Unacceptably limp and soggy | <0.25 |
| 2. | Marginally Limp and soggy | 0.25–0.31 |
| 3. | Preferred | 0.32–0.46 |
| 4. | Marginally dry and tough | 0.47–0.53 |
| 5. | Unacceptably dry and tough | >0.53 |

The process of the present invention is practiced by initially washing and normally peeling whole potatoes followed by cutting to a desired strip size and shape. The raw cut strips are then blanched in water or steam for a desired time and at a desired temperature, such as blanching in water at approximately 165° F. for about 10–20 minutes depending upon strip size. In a water blanching step, dextrose and/or sodium acid pyrophosphate (SAPP) are normally present in minor amounts for improved browning and color control during subsequent processing. The potato strips are drained of excess water in any suitable manner after blanching.

The preferred parfrying conditions, which have been discovered for optimum reconstitutable potato strips with substantially optimum quality by any one of several reconstitution methods, include a first relatively short parfry step in hot oil at a temperature typically about 360° F. followed by an intermediate cooling step wherein the potato strips are frozen rapidly. The once-parfried and frozen strips are then subjected to a second parfrying step in hot oil at a temperature normally about 360° F. followed by freezing and packaging for subsequent storage and/or shipment prior to reconstitution for consumption.

Parfried and frozen potato strips prepared in accordance with the above-described double parfry process are prepared in test groups which are analyzed to determine the SAC value for the particular test group. SAC value will provide an accurate indication of the overall strip quality when reconstituted, irrespective of the particular strip size and shape and the particular method of heating during reconstitution. More particularly, an SAC value in the range of 0.39±0.07 indicates that the parfrying processing parameters have been selected for obtaining optimum strip quality when reconstituted. SAC values in variance with the preferred range will indicate that the reconstituted strips will be too limp and soggy or too dry and tough, in accordance with the quality scale rating, thereby indicating appropriate modification of the parfrying parameters, such as fry time or oil temperature, to increase or decrease moisture loss during processing, as required. When the SAC value has been optimized to the preferred range, the potato strips can be parfried and frozen in production quantities with assurance that such product strips will reconstitute with optimum physical characteristics and will be adapted for reconstitution by various methods.

While the basis for the substantially improved strip quality upon reconstitution after two parfrying steps separated by the intermediate freezing step is not entirely understood, it is believed that the intermediate freezing step creates a multitude of relatively small and virtually microscopic surface cracks in the exterior surface of the once-parfried potato strips. In addition, the freezing step causes at least some cellular concentration of strip solids content whereby substantial quantities of moisture within the strips is released or migrates from within solid cells to between the cells. Upon parfrying the strips a second time, this partially released intercellular moisture is believed to escape rapidly through the surface cracks thereby providing a very rapid moisture loss rate in a relatively short frying time.

With two parfrying steps, total moisture loss has been shown to be generally equal to or greater than that achievable in a conventional single parfry step of the same overall total frying time. However, in the double parfry process, a substantial initial portion of the second parfry step is required to thaw and reheat the frozen strips back to frying temperature whereby the twice-parfried strips are actually maintained at frying temperature a substantially shorter time period than strips subjected to a conventional single parfry process. It has been found that this results in marked improvements in overall potato strip quality when parfried potato strips are reconstituted, as indicated by the following examples, and further renders the potato strips highly adaptable to reconstitution at the option of kitchen personnel by microwave oven heating, conventional oven, convection oven heating, or rapid finish frying. In the case of microwave oven or convection oven heating, the potato strips exhibit substantially optimized quality and physical characteristics closely resembling the physical characteristics of strips reconstituted in hot oil. In the case of reconstitution by finish frying, the potato strips can be reconstituted significantly faster than strips prepared using a single parfry process, thereby resulting in energy savings to the reconstituter. Moreover, such finish fried strips have been found to exhibit substantially optimized physical characteristics which are maintained substantially longer than strips subjected to a single parfry process.

The following examples are provided to demonstrate applicability of the process of this invention to a variety of different potato strip sizes and shapes which are parfried and frozen for subsequent reconstitution by alternative methods.

EXAMPLE 1

Russet Burbank potatoes were peeled and trimmed and cut into so-called shoestring strips with an average length on the order of about three inches and cross-sectional side dimensions of about 0.283×0.287 inches. Following determination of initial moisture content, these potato strips were processed in groups as indicated in Table I-1 by blanching in water including sufficient quantities of dextrose and SAPP for color control during processing. The blanched strips were then subjected in test groups to two parfrying steps with an intermediate cooling step including blast freezing for ten minutes at −40° F. before final blast freezing at −40° F.

Analysis of the twice parfried and frozen (PFF) potato strips was performed to determined remaining moisture by percent weight and absorbed fat by percent weight. These values were used to determine PML and GML, as described previously, whereas PSA was a direct calculation of the average surface area of the strips per inch length. The SAC value could then be determined to predict product physical characteristics when reconstituted by various heating methods. The analyzed values and calculated values are shown for the processed groups in Table II-1.

Various size portions of the twice parfried and frozen groups of potato strips were reconstituted as indicated in the following Table III-1. This table clearly shows a consistency in the SAC value range of 0.39±0.07 and further that high quality reconstituted potato strips can be obtained generally irrespective of the reconstitution method. When reconstituted by finish frying in oil, the potato strips maintained crispiness on the exterior nearly twice as long as similar strips subjected to a single parfrying process.

TABLE I-1

| | PROCESSING CONDITIONS | | | |
|---|---|---|---|---|
| Sample | % Moisture Raw | Water Blanch | First Parfry | Second Parfry |
| 1A | 79% | 10 Min. 165° F. | 50 Sec. 360° F. | 180 Sec. 360° F. |
| 1B | 81% | 10 Min. 165° F. | 50 Sec. 360° F. | 150 Sec. 360° F. |
| 1C | 81% | 10 Min. 165° F. | 50 Sec. 360° F. | 150 Sec. 360° F. |
| 1D | 79% | 10 Min. 165° F. | 50 Sec. 360° F. | 240 Sec. 360° F. |
| 1E | 81% | 10 Min. 165° F. | 50 Sec. 360° F. | 120 Sec. 360° F. |
| 1F | 81% | 10 Min. 165° F. | 50 Sec. 360° F. | 120 Sec. 360° F. |

TABLE II-1

| | | | SAC VALUE | | | |
|---|---|---|---|---|---|---|
| Sample | PFF % Moisture | % Fat | PSA | PML | GML | SAC |
| 1A | 43.0% | 14.8% | 1.194 | .456 | .729 | .40 |
| 1B | 48.6% | 13.5% | 1.194 | .400 | .699 | .33 |
| 1C | 48.6% | 13.5% | 1.194 | .400 | .699 | .33 |
| 1D | 40.0% | 16.1% | 1.194 | .494 | .758 | .45 |
| 1E | 53.9% | 11.2% | 1.194 | .335 | .638 | .26 |
| 1F | 53.9% | 11.2% | 1.194 | .335 | .638 | .26 |

TABLE III-1

| | | RECONSTITUTION | | | |
|---|---|---|---|---|---|
| Sample | *Method | Quantity | Setting* | Rating | Remarks |
| 1A | MW | 3 oz. | 90 Sec. 650 w | 3 | crisp exterior moist/mealy interior |
| 1B | CO | 11 oz. | 135 Sec. 450° F. | 3 | crisp exterior moist/mealy interior |
| 1C | FF | 16 oz. | 30 Sec. 360° F. | 3 | crisp exterior moist/mealy interior |

TABLE III-1-continued

| | | RECONSTITUTION | | | |
|---|---|---|---|---|---|
| Sample | *Method | Quantity | Setting* | Rating | Remarks |
| 1D | MW | 3 oz. | 90 Sec. 650 w | 4 | crisp, tough exterior, dry/mealy interior |
| 1E | CO | 11 oz. | 135 Sec. 450° F. | 1 | very little crisp soggy interior |
| 1F | FF | 16 oz | 30 Sec. 360° F. | 1 | very little crisp soggy interior |

MW = Microwave ovenheating (power setting at 650 Watts)
CO = Convection oven heating (preheated)
FF = Finish Frying in hot oil

EXAMPLE 2

Russet Burbank potatoes were processed in test groups generally as described with respect to Example 1 except that the potatoes were cut into conventional or regular French fry strips having an average length of about three inches and cross-sectional side dimension of about 0.438 inch square. The potato strips were subjected to two parfrying steps with an intermediate blast freeze step for 10 minutes at −40° F. and a final freeze step at −40° F.

The potatoes were processed, analyzed, and reconstituted in test groups as indicated in the following tables I-2, II-2, and III-2. Once again, the SAC value provided an accurate indication of quality on reconstitution, and the twice parfried strips reconstituted with excellent quality characteristics regardless of the reconstitution method chosen.

These results further indicate improved quality of the potato strips on reconstitution when the strips have been twice parfried with an intermediate freeze step as opposed to a single parfry process reflected by test groups 2G and 2H. The once-parfried strips exhibited a combination of limp or wet yet tough characteristics resulting in a less than optimum product.

TABLE I-2

| | PROCESSING CONDITIONS | | | |
|---|---|---|---|---|
| Sample | % Moisture Raw | Water Blanch | First Parfry | Second Parfry |
| 2A | 80% | 21 Min. 170° F. | 100 Sec. 360° F. | 240 Sec. 360° F. |
| 2B | 80% | 21 Min. 170° F. | 180 Sec. 350° F. | 180 Sec. 360° F. |
| 2C | 80% | 21 Min. 170° F. | 180 Sec. 350° F. | 180 Sec. 360° F. |
| 2D | 80% | 21 Min. 170° F. | 100 Sec. 360° F. | 120 Sec. 360° F. |
| 2E | 80% | 21 Min. 170° F. | 180 Sec. 350° F. | 300 Sec. 360° F. |
| 2F | 80% | 21 Min. 170° F. | 180 Sec. 350° F. | 300 Sec. 360° F. |
| 2G | 80% | 21 Min. 170° F. | 340 Sec. 360° F. | — |
| 2H | 80% | 21 Min. 170° F. | 250 Sec. 360° F. | — |

TABLE II-2

| | | | SAC VALUE | | | |
|---|---|---|---|---|---|---|
| Sample | PFF Moisture | % Fat | PSA | PML | GML | SAC |
| 2A | 54.0% | 10.5% | 1.88 | .325 | .620 | .38 |
| 2B | 54.9% | 9.8% | 1.88 | .314 | .611 | .36 |
| 2C | 54.9% | 9.8% | 1.88 | .314 | .611 | .36 |
| 2D | 59.0% | 8.4% | 1.88 | .263 | .548 | .27 |
| 2E | 49.0% | 12.0% | 1.88 | .400 | .700 | .53 |
| 2F | 48.0% | 12.0% | 1.88 | .400 | .700 | .53 |

TABLE II-2-continued

| | | SAC VALUE | | | | |
|---|---|---|---|---|---|---|
| Sample | PFF Moisture | % Fat | PSA | PML | GML | SAC |
| 2G | 55.1% | 9.0% | 1.88 | .311 | .616 | .36 |
| 2H | 59.4% | 7.8% | 1.88 | -.258 | .547 | .27 |

TABLE III-2

| | | RECONSTITUTION | | | |
|---|---|---|---|---|---|
| Sample | Method | Quantity | Setting | Rating | Remarks |
| 2A | MW | 3.5 oz. | 120 Sec. 650 w | 3 | superb |
| 2B | CO | 24 oz. | 150 Sec. 450° F. | 3 | superb |
| 2C | FF | 16 oz. | 90 Sec. 360° F. | 3 | superb |
| 2D | MW | 3.5 oz. | 120 Sec. 650 w | 1 | little crispiness very soggy |
| 2E | CO | 24 oz. | 150 Sec. 450° F. | 5 | very tough and dry |
| 2F | FF | 16 oz. | 90 Sec. 360° F. | 5 | very tough and dry |
| 2G | MW | 3.5 oz. | 120 Sec. 650 w | — | crisp, tough exterior slightly soggy interior |
| 2H | CO | 24 oz. | 150 Sec. 450° F. | — | very soggy |

EXAMPLE 3

Russet Burbank potatoes were prepared and processed as described in Examples 1 and 2 above except that the potatoes were cut into strips averaging about three inches in length and having a rectangular cross section with side dimensions of about 0.438×0.875 inches. The twice parfried and frozen strips were analyzed and reconstituted with the results set forth in the tables below.

TABLE I-3

| | PROCESSING CONDITIONS | | | |
|---|---|---|---|---|
| Sample | % Moisture Raw | Water Blanch | First Parfry | Second Parfry |
| 3A | 79% | 23 Min. 165° F. | 100 Sec. 360° F. | 240 Sec. 360° F. |
| 3B | 79% | 23 Min. 165° F. | 100 Sec. 350° F. | 240 Sec. 360° F. |
| 3C | 79% | 23 Min. 165° F. | 100 Sec. 350° F. | 240 Sec. 360° F. |
| 3D | 79% | 23 Min. 165° F. | 100 Sec. 360° F. | 180 Sec. 360° F. |
| 3E | 79% | 23 Min. 165° F. | 100 Sec. 360° F. | 300 Sec. 360° F. |
| 3F | 79% | 23 Min. 165° F. | 100 Sec. 360° F. | 300 Sec. 360° F. |

TABLE II-3

| | | SAC VALUE | | | | |
|---|---|---|---|---|---|---|
| Sample | PFF Moisture | % Fat | PSA | PML | GML | SAC |
| 3A | 59.0% | 7.8% | 2.88 | .253 | .578 | .42 |
| 3B | 60.6% | 7.9% | 2.88 | .243 | .519 | .36 |
| 3C | 60.6% | 7.9% | 2.88 | .243 | .519 | .36 |
| 3D | 61.3% | 6.8% | 2.88 | .224 | .489 | .32 |
| 3E | 56.6% | 9.2% | 2.88 | .293 | .586 | .49 |
| 3F | 56.6% | 9.2% | 2.88 | .293 | .586 | .49 |

TABLE III-3

| | | RECONSTITUTION | | | |
|---|---|---|---|---|---|
| Sample | Method | Quantity | Setting | Rating | Remarks |
| 3A | MW | 3.5 oz. | 120 Sec. 650 w | 3 | crisp exterior moist/mealy interior |
| 3B | CO | 24 oz. | 180 Sec. 450° F. | 3 | excellent |
| 3C | FF | 16 oz. | 90 Sec. 360° F. | 3 | excellent |
| 3D | MW | 3.5 oz. | 120 Sec. 650 w | 2 | some exterior crisp-slightly wet interior |
| 3E | CO | 24 oz. | 180 Sec. 450° F. | 4 | crisp but tough and dry |
| 3F | FF | 16 oz | 90 Sec. 360° F. | 4 | crisp but tough and dry |

EXAMPLE 4

Russet Burbank potatoes were prepared and processed in accordance with the foregoing examples except that the potatoes were cut into so-called crinkle cut strips having an average length of about three inches and average cross-sectional side dimensions (measured from hill to opposing valley) of 0.429×0.459. These strips were subjected to double parfry processing conditions with intermediate freeze step in test groups 4A through 4F. A single parfry step was used for test groups 4G and 4H.

With these crinkle cut strips, it was determined that the actual average surface area of the strips was about fifteen percent (15%) greater than the surface area of a regular cut strip with similar dimensions but generally flat, uncurved sides. As a result of this relatively increased strip surface area but no relative increase in strip mass, the relative moisture loss rate per increment of surface area is decreased. Accordingly, the moisture loss subproduct of percent and grams moisture loss is reduced by a factor of one minus the percent surface area increase (in this example, 1−0.15, or 0.85).

The crinkle cut strips were reconstituted by various methods, as shown in the tables below. Once again, the SAC value (normalized) provided a consistently accurate prediction of product quality, and the twice parfried product strips exhibited superior characteristics to those subjected to a single parfry step.

TABLE I-4

| | PROCESSING CONDITIONS | | | |
|---|---|---|---|---|
| Sample | % Moisture Raw | Water Blanch | First Parfry | Second Parfry |
| 4A | 79% | 23 Min. 170° F. | 100 Sec. 365° F. | 240 Sec. 360° F. |
| 4B | 81% | 23 Min. 170° F. | 100 Sec. 365° F. | 210 Sec. 360° F. |
| 4C | 81% | 23 Min. 170° F. | 100 Sec. 365° F. | 210 Sec. 360° F. |
| 4D | 79% | 23 Min. 170° F. | 100 Sec. 365° F. | 290 Sec. 360° F. |
| 4E | 81% | 23 Min. 165° F. | 100 Sec. 365° F. | 150 Sec. 360° F. |
| 4F | 81% | 10 Min. 170° F. | 100 Sec. 365° F. | 150 Sec. 360° F. |
| 4G | 80% | 10 Min. 170° F. | 340 Sec. 365° F. | — |
| 4H | 80% | 10 Min. 170° F. | 390 Sec. 365° F. | — |

TABLE II-4

| | | | SAC VALUE | | | | |
|---|---|---|---|---|---|---|---|
| Sample | PFF % Moisture | % Fat | PSA | NF* | PML | GML | SAC |
| 4A | 50.1% | 12.3% | 1.907 | .85 | .366 | .646 | .38 |
| 4B | 53.3% | 9.7% | 1.907 | .85 | .342 | .662 | .37 |
| 4C | 53.3% | 9.7% | 1.907 | .85 | .342 | .662 | .37 |
| 4D | 47.5% | 13.0% | 1.907 | .85 | .399 | .680 | .44 |
| 4E | 56.7% | 8.1% | 1.907 | .85 | .300 | .622 | .30 |
| 4F | 56.7% | 8.1% | 1.907 | .85 | .300 | .622 | .30 |
| 4G | 50.4% | 11.0% | 1.907 | .85 | .370 | .674 | .40 |
| 4H | 48.9% | 11.3% | 1.907 | .85 | .389 | .693 | .44 |

*Normalization factor

TABLE III-4

| | | RECONSTITUTION | | | |
|---|---|---|---|---|---|
| Sample | Method | Quantity | Setting | Rating | Remarks |
| 4A | MW | 3 oz. | 90 Sec. 650 w | 3 | very good |
| 4B | CO | 24 oz. | 180 Sec. 450° F. | 3 | excellent |
| 4C | FF | 16 oz. | 90 Sec. 360° F. | 3 | excellent |
| 4D | MW | 3 oz. | 90 Sec. 650 w | 4 | crisp, slight tough exterior, slight dry interior |
| 4E | CO | 24 oz. | 180 Sec. 450° F. | 2 | slight crisp exterior, slight wet interior |
| 4F | FF | 16 oz. | 90 Sec. 360° F. | 2 | slight crisp exterior, slight wet interior |
| 4G | MW | 3 oz. | 90 Sec. 650 w | — | exterior crisp but tough, interior slightly wet |
| 4H | CO | 24 oz. | 180 Sec. 450° F. | — | exterior very tough interior slightly dry |

EXAMPLE 5

Russet Burbank whole potatoes were peeled and cut into ten wedge-shaped slices each having an average length of about three inches and an average surface area of 6.0 inches square, resulting in a PSA value of 2.0. These wedge slices or strips were processed in test groups as indicated in the following tables, followed by analyzation for moisture and fat content after parfrying and freezing and then reconstitution by various methods.

TABLE I-5

| | PROCESSING CONDITIONS | | | |
|---|---|---|---|---|
| Sample | % Moisture Raw | Water Blanch | First Parfry | Second Parfry |
| 5A | 80% | 13.5 Min. 170° F. | 120 Sec. 360° F. | 240 Sec. 360° F. |
| 5B | 81% | 14 Min. 175° F. | 120 Sec. 360° F. | 240 Sec. 360° F. |
| 5C | 81% | 14 Min. 175° F. | 120 Sec. 360° F. | 240 Sec. 360° F. |
| 5D | 80% | 13.5 Min. 170° F. | 120 Sec. 360° F. | 300 Sec. 360° F. |
| 5E | 81% | 14 Min. 175° F. | 120 Sec. 360° F. | 150 Sec. 360° F. |
| 5F | 81% | 14 Min. 175° F. | 120 Sec. 360° F. | 150 Sec. 360° F. |

TABLE II-5

| | | SAC VALUE | | | | |
|---|---|---|---|---|---|---|
| Sample | PFF % Moisture | % Fat | PSA | PML | GML | SAC |
| 5A | 53.9% | 9.5% | 2.0 | .326 | .632 | .41 |
| 5B | 56.6% | 9.2% | 2.0 | .301 | .612 | .37 |
| 5C | 56.6% | 9.2% | 2.0 | .301 | .612 | .37 |
| 5D | 50.8% | 10.4% | 2.0 | .365 | .673 | .49 |
| 5E | 59.3% | 8.2% | 2.0 | .268 | .572 | .31 |
| 5F | 59.3% | 8.2% | 2.0 | .268 | .572 | .31 |

TABLE III-5

| | | RECONSTITUTION | | | |
|---|---|---|---|---|---|
| Sample | Method | Quantity | Setting | Rating | Remarks |
| 5A | MW | 3.5 oz. | 120 Sec. 650 w | 3 | moderate crisp exterior, mealy interior |
| 5B | CO | 24 oz. | 240 Sec. 450° F. | 3 | moderate crisp exterior, mealy interior |
| 5C | FF | 16 oz. | 90 Sec. 360° F. | 3 | moderate crisp exterior, mealy interior |
| 5D | MW | 3.5 oz. | 120 Sec. 650 w | 4 | slightly tough exterior, slightly dry interior |
| 5E | CO | 24 oz. | 240 Sec. 450° F. | 2 | slightly crisp exterior slightly wet interior |
| 5F | FF | 16 oz | 90 Sec. 360° F. | 2 | slightly crisp exterior, slightly wet interior |

EXAMPLE 6

Russet Burbank potatoes were prepared in accordance with Example 5 except that the potatoes were not peeled, thereby providing wedge-shaped potato slices or strips having two exposed cut surfaces and a broad arcuate surface covered by peel. As described previously, the peel has been found to retard or substantially prevent moisture loss therethrough during parfrying while permitting heat ingress to correspondingly increase relative moisture loss per increment of exposed strip surface area.

The peel-on wedge strips were processed as indicated in the following tables, with the moisture loss subproduct being normalized to account for the presence of the peel. More particularly, the percent of surface area covered by peel for each strip was determined to be 31.2%, whereby the normalization factor of these test strips was one plus the percent covered by peel, or 1.312.

TABLE I-6

| | PROCESSING CONDITIONS | | | |
|---|---|---|---|---|
| Sample | % Moisture Raw | Water Blanch | First Parfry | Second Parfry |
| 6A | 80% | 40 Min. 165° F. | 120 Sec. 360° F. | 240 Sec. 360° F. |
| 6B | 81% | 9 Min. 180° F. | 100 Sec. 360° F. | 210 Sec. 360° F. |
| 6C | 81% | 9 Min. 180° F. | 100 Sec. 360° F. | 210 Sec. 360° F. |
| 6D | 80% | 40 Min. 165° F. | 120 Sec. 360° F. | 180 Sec. 360° F. |
| 6E | 81% | 9 Min. 180° F. | 100 Sec. 360° F. | 300 Sec. 360° F. |
| 6F | 81% | 9 Min. | 100 Sec. | 300 Sec. |

TABLE I-6-continued

| | PROCESSING CONDITIONS | | | |
|---|---|---|---|---|
| Sample | % Moisture Raw | Water Blanch | First Parfry | Second Parfry |
| | | 180° F. | 360° F. | 360° F. |

TABLE II-6

| Sample | PFF % Moisture | % Fat | PSA | NF | PML | GML | SAC |
|---|---|---|---|---|---|---|---|
| 6A | 59% | 10.3% | 2.0 | 1.312 | .263 | .520 | .36 |
| 6B | 61% | 6.1% | 2.0 | 1.312 | .247 | .565 | .37 |
| 6C | 61% | 6.1% | 2.0 | 1.312 | .247 | .565 | .37 |
| 6D | 64% | 8.0% | 2.0 | 1.312 | .200 | .429 | .23 |
| 6E | 54.5% | 11.3% | 2.0 | 1.312 | .327 | .626 | .54 |
| 6F | 54.5% | 11.3% | 2.0 | 1.312 | .327 | .626 | .54 |

TABLE III-6

| | | RECONSTITUTION | | | |
|---|---|---|---|---|---|
| Sample | Method | Quantity | Setting | Rating | Remarks |
| 6A | MW | 3.5 oz. | 120 Sec. 650 w | 3 | moderate crisp exterior, moist mealy interior |
| 6B | CO | 1.5 lb. | 240 Sec. 450° F. | 3 | crisp, tender exterior, moist, mealy interior |
| 6C | FF | 1 lb. | 90 Sec. 360° F. | 3 | very crisp exterior, moist mealy interior |
| 6D | MW | 3.5 oz. | 120 Sec. 650 w | 1 | wet soggy |
| 6E | CO | 1.5 lb. | 240 Sec. 450° F. | 5 | dry, tough, hollowed interior |
| 6F | FF | 1 lb. | 90 Sec. 360° F. | 5 | dry, tough, hollowed interior |

The foregoing examples illustrate consistent prediction of physical characteristics upon reconstitution irrespective of the method of reconstitution. Moreover, the foregoing examples illustrated that consistent high quality characteristics can be obtained by adjusting parameters to obtain an SAC value within the preferred range. By using the double parfry process described with intermediate freeze step, the parfried and frozen potato strips can be reconstituted consistently with substantially optimized physical characteristics regardless of the method of reconstitution.

Various modifications and improvements to the invention described herein are believed to be apparent to one of ordinary skill in the art. Accordingly, no limitation on the invention is intended, except by way of the appended claims.

What is claimed is:

1. A process for parfrying and freezing potato strips for subsequent reconstitution, by any one of microwave oven heating, conventional oven heating, convection oven heating, and finish frying, prior to consumption, comprising the steps of:
   blanching the potato strips using heated water as the blanching medium;
   parfrying the potato strips a first time in hot oil;
   promptly and substantially reducing the temperature level of the once-parfried potato strips by freezing the strips;
   parfrying the temperature-reduced potato strips a second time in hot oil at a temperature and for a period of time such that the product of strip surface area and moisture loss from a raw state at the conclusion of said second parfrying step generally equals a predetermined constant value, said second parfrying step including placing the strips, while in a substantially frozen state, into the hot oil; and
   freezing and storing the twice-parfried potato strips.

2. The process of claim 1 wherein said temperature reducing step comprises blast freezing the potato strips.

3. The process of claim 1 wherein said freezing and storing step comprises freezing the potato strips for at least about ten minutes at a temperature of about −40° F.

4. The process of claim 3 wherein said freezing and storing step comprises blast freezing.

5. The process of claim 4 wherein said freezing and storing step comprises blast freezing the potato strips at a temperature of about −40° F.

6. The process of claim 1 wherein said second parfrying step comprises parfrying the potato strips in hot oil at a temperature and for a period of time until the product of average strip surface area, moisture loss from a raw state in percent weight, and grams moisture loss from a raw state generally equals the predetermined constant value.

7. The process of claim 1 wherein said second parfrying step comprises parfrying the potato strips in hot oil at a temperature and for a period of time until the product of average strip surface area per inch length, moisture loss from a raw state by percent weight, and grams moisture loss from a raw state is generally within the range of from about 0.25 to about 0.53.

8. The process of claim 7 wherein said second parfrying step comprises parfrying the potato strips until said product is generally within the range of from about 0.32 to about 0.46.

9. The process of claim 7 wherein said first and second parfrying steps comprise parfrying the potato strips in hot oil at a temperature on the order of about 360° F.

10. The process of claim 1 wherein said second parfrying step comprises parfrying the potato strips a second time in test groups, freezing the twice-parfried strips of each test group, analyzing the twice parfried and frozen strips of each test group for moisture content and fat content, calculating the product of strip surface area, moisture loss by percent weight, and mass moisture loss, and adjusting the parfrying parameters of said second parfrying step for a subsequent test group until said product generally equals said predetermined constant value.

11. The process of claim 1 wherein the product strips comprise crinkle cut strips, and wherein said second parfrying step comprises parfrying the potato strips in hot oil at a temperature and for a period of time until the product of average strip surface area per inch length, moisture loss from a raw state by percent weight, grams moisture loss from a raw state, and one minus the percent increase in average strip surface area in comparison with the average surface area of potato strips having a regular cut shape is generally within the range of from about 0.25 to about 0.53.

12. The process of claim 11 wherein said second parfrying step comprises parfrying the potato strips until said product is generally within the range of from about 0.32 to about 0.46.

13. The process of claim 1 wherein the product strips comprise strips having a portion thereof covered by peel, and wherein said second parfrying step comprises parfrying the potato strips in hot oil at a temperature and for a period of time until the product of average strip surface area per inch length, moisture loss from a raw state by percent weight, grams moisture loss from a raw state, and one plus the average percent of surface area covered by peel is generally within the range of from about 0.25 to about 0.53.

14. The process of claim 13 wherein said second parfrying step comprises parfrying the potato strips until said product is generally within the range of from about 0.32 to about 0.46.

15. A process for parfrying and freezing potato strips for subsequent reconstitution, by any one of a plurality of different heating methods, prior to consumption, comprising the steps of:
blanching the potato strips using heated water as the blanching medium;
parfrying the potato strips a first time in hot oil;
promptly freezing the once-parfried potato strips;
parfrying the frozen potato strips a second time in hot oil by placing the strips while in a substantially frozen state into the hot oil;
freezing the twice-parfried potato strips; and
controlling the parameters of said blanching and said first and second parfrying steps such that the product of average strip surface area, total moisture loss in percent weight, and mass moisture loss generally equals a predetermined constant value.

16. The process of claim 15 wherein said freezing steps both comprise blast freezing the potato strips at a temperature of about −40° F.

17. The process of claim 15 wherein the potato strips have a generally regular exterior surface shape, and wherein said second parfrying step comprises parfrying the potato strips in hot oil at a temperature and for a period of time until the product of average strip surface area per inch length, moisture loss from a raw state by percent weight, and grams moisture loss from a raw state is generally within the range of from about 0.25 to about 0.53.

18. The process of claim 17 wherein said second parfrying step comprises parfrying the potato strips until said product is generally within the range of from about 0.32 to about 0.46.

19. The process of claim 15 wherein the product strips comprise crinkle cut strips, and wherein said second parfrying step comprises parfrying the potato strips in hot oil at a temperature and for a period of time until the product of average strip surface area per inch length, moisture loss from a raw state by percent weight, grams moisture loss from a raw state, and one minus the percent increase in aveage strip surface area in comparison with the average surface area of potato strips having a regular cut shape is generally within the range of from about 0.25 to about 0.53.

20. The process of claim 19 wherein said second parfrying step comprises parfrying the potato strips until said product is generally within the range of from about 0.32 to about 0.46.

21. The process of claim 15 wherein the product strips comprise strips having a portion thereof covered by peel, and wherein sid second parfrying step comprises parfrying the potato strips in hot oil at a temperature and for a period of time until the product of average strip surface area per inch length, moisture loss from a raw state by percent weight, grams moisture loss from a raw state, and one plus the average percent of surface area covered by peel is generally within the range of from about 0.25 to about 0.53.

22. The process of claim 21 wherein said second parfrying step comprises parfrying the potato strips until said product is generally within the range of from about 0.32 to about 0.46.

23. A process for parfrying and freezing potato strips for subsequent reconstitution, by any one of a plurality of methods, prior to consumption, comprising the steps of:
blanching the potato strips using heated water as the blanching medium;
parfrying the potato strips in hot oil a first time;
promptly freezing the once-parfried potato strips;
parfrying the potato strips in hot oil a second time at a temperature and for a period of time such that the product of average strip surface area, moisture loss from a raw state by percent weight, and mass moisture loss from a raw state at the conclusion of said parfrying step generally equals a predetermined constant value, said second parfrying step including placing the strips while in a substantially frozen state into the hot oil; and
freezing the twice-parfried potato strips.

24. The process of claim 23 wherein said second parfrying step is at a controlled time and temperature until the product of average strip surface area per inch length, moisture loss from a raw state by percent weight, and grams moisture loss from a raw state is generally within the range of from about 0.32 to about 0.46.

25. A process for parfrying and freezing potato strips for subsequent reconstitution, by any one of a plurality of methods, prior to consumption, comprising the steps of:
blanching the potato strips using heated water as the blanching medium;
parfrying the potato strips in hot oil a first time;
promptly freezing the once-parfried potato strips;
parfrying the potato strips in hot oil a second time by placing the strips while in a substantially frozen state into the hot oil;
controlling the time and temperature of said second parfrying step to obtain a total moisture loss from the strips from a raw state predetermined in accordance with average strip size and surface area; and
promptly freezing the twice-parfried potato strips.

26. The process of claim 25 wherein the potato strips have a generally regular exterior surface shape, and wherein said second parfrying step comprises parfrying the potato strips in hot oil at a temperature and for a period of time until the product of average strip surface area per inch length, moisture loss from a raw state by percent weight, and grams moisture loss from a raw state is generally within the range of from about 0.25 to about 0.53.

27. The process of claim 26 wherein said second parfrying step comprises parfrying the potato strips until said product is generally within the range of from about 0.32 to about 0.46.

28. The process of claim 25 wherein the product strips comprise crinkle cut strips, and wherein said second parfrying step comprises parfrying the potato strip in hot oil at a temperature and for a period of time until the product of average strip surface area per inch length, moisture loss from a raw state by percent weight, grams moisture loss from a raw state, and one minus the percent increase in average strip surface area in comparison with the average surface area of potato strips having a regular cut shape is generally within the range of from about 0.25 to about 0.53.

29. The process of claim 28 wherein said second parfrying step comprises parfrying the potato strips until said product is generally within the range of from about 0.32 to about 0.46.

30. The process of claim 25 wherein the product strips comprise strips having a portion thereof covered by peel, and wherein said second parfrying step comprises parfrying the potato strips in hot oil at a temperature and for a period of time until the product of average strip surface area per inch length, moisture loss from a raw state by percent weight, grams moisture loss from a raw state, and one plus the average percent of surface area covered by peel is generally within the range of from about 0.25 to about 0.53.

31. The process of claim 30 wherein said second parfrying step comprises parfrying the potato strips until said product is generally within the range of from about 0.32 to about 0.46.

32. A process for parfrying and freezing potato strips cut raw from whole potatoes and blanched using heated water as the blanching medium, said strips being for subsequent reconstitution, by any one of microwave oven heating, conventional oven heating, convection oven heating, and finish frying, prior to consumption, consisting of the steps of:
   parfrying the blanched potato strips a first time by immersion in hot oil at a frying temperature;
   promptly freezing the once-parfried potato strips substantially immediately following said first parfrying step;
   parfrying the potato strips a second time by immersion of the potato strips while in a substantially frozen state into hot oil at a frying temperature; and
   freezing the twice-parfried potato strips.

33. The process of claim 32 wherein said second parfrying step includes parfrying the strips in hot oil at a frying temperature and for a period of time such that the product of average strip surface area per unit length, moisture loss from a raw state by percent weight, and mass moisture loss from a raw state at the conclusion of said second parfrying step generally equals a predetermined constant value.

* * * * *